Oct. 19, 1954          R. T. CURCURU              2,691,920
                    REARVIEW MIRROR SHIELD
Filed March 1, 1951                        2 Sheets-Sheet 1
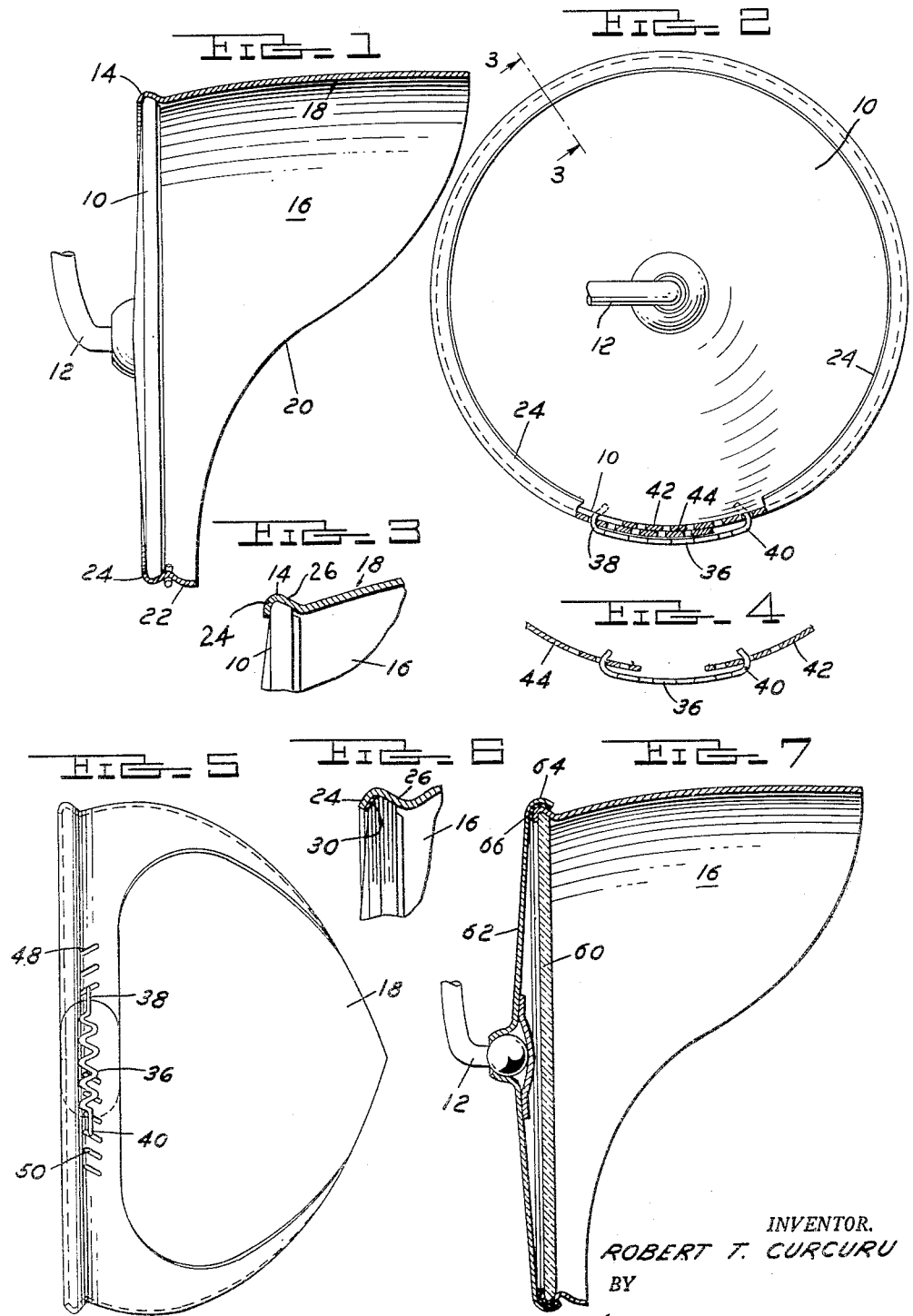
INVENTOR.
ROBERT T. CURCURU
BY
Barnes, Kisselle, Laughlin & Raisch
ATTORNEYS

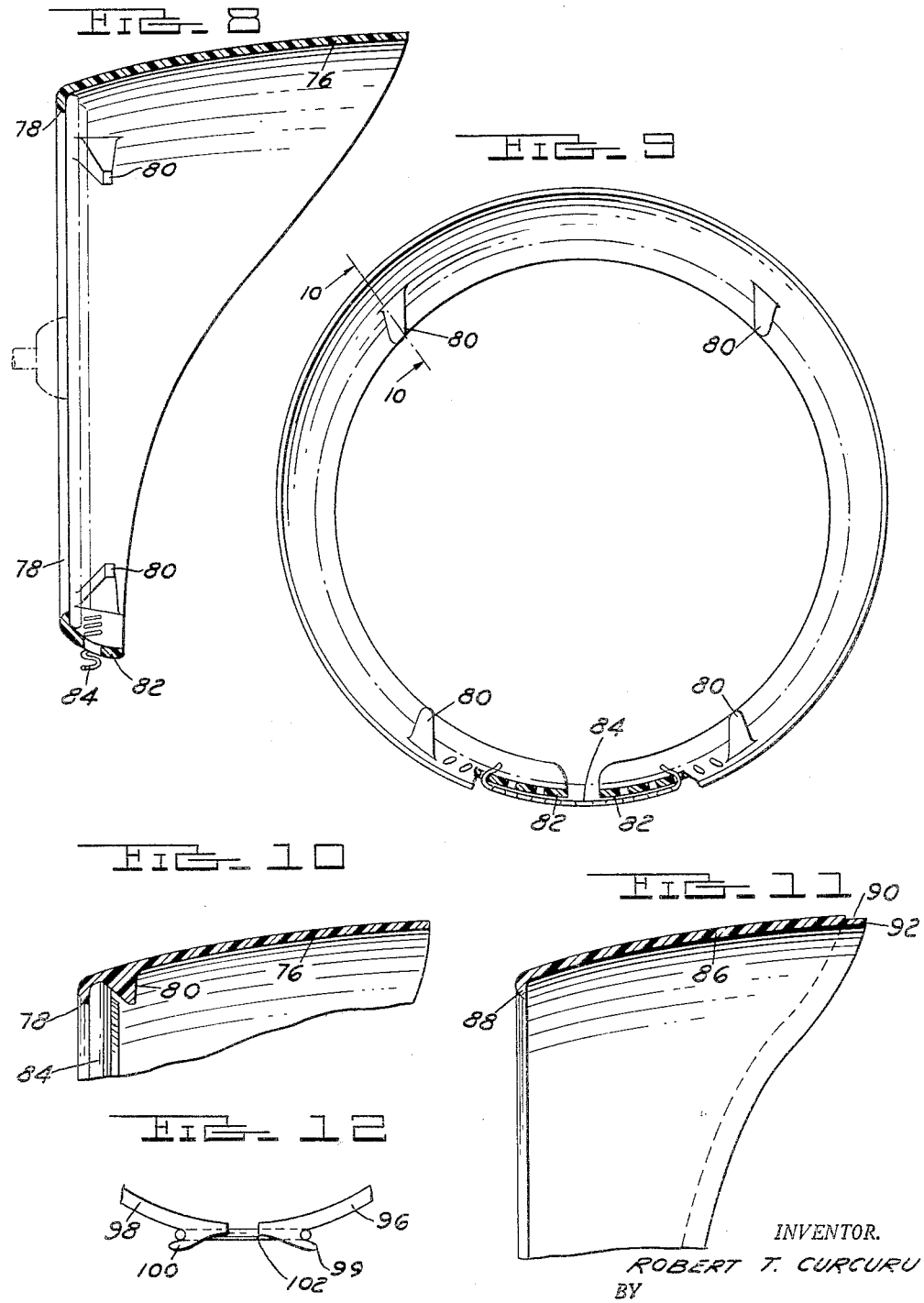

Patented Oct. 19, 1954

2,691,920

UNITED STATES PATENT OFFICE 2,691,920

REARVIEW MIRROR SHIELD

Robert T. Curcuru, Ferndale, Mich.

Application March 1, 1951, Serial No. 213,351

2 Claims. (Cl. 88—77)

This invention relates to a rear view mirror shield.

It is an object of the present invention to provide a rear view mirror appliance which can either be applied directly to the mirror in the process of tis manufacture or applied as an accessory subsequent to the manufacture and installation of the mirror.

It is an object of the invention to provide a mirror shield which portects the mirror against rain, dirt, and overhead light glare; and it effectively seals the mirror against water driving in from the back plate of the mirror.

It is a further object to provide a mirror accessory which can be readily applied to an assembled mirror frame which may vary in its dimensions and which will cam itself in place to provide a weather seal and novel locking fastener.

Other objects and features of the invention having to do with details of construction will be apparent in the following description and claims.

Drawings accompany the specification, and the various views thereof may be briefy described as:

Figure 1, a vertical section through an assembled mirror shield.

Figure 2, a view showing the back of a mirror and the retaining edge of the shield.

Figure 3, a sectional view on line 3—3 of Figure 2.

Figure 4, a view of the latching mechanism of the mirror shield showing a modified position.

Figure 5, a bottom view of the mirror showing the fastening means.

Figure 6, a modified construction showing a gasket seal along one side of the shield retaining groove.

Figure 7, a modification showing the shield applied directly to the mirror prior to the application of the mirror frame.

Figure 8, a view of a modified type of mirror shield which is formed of a pressed or molded plastic.

Figure 9, an end view of the shield as shown in Figure 8.

Figure 10, a sectional view on line 10—10 of Figure 9.

Figure 11, a view of a modified shield section illustrating a drip groove.

Figure 12, a view of a modified clamping construction for the ends of the encircling shield.

Referring to the drawings, in Figure 1 the mirror shield is shown applied to a mirror frame which is shown generally at 10 held by bracket 12. The mirror shield consists of a grooved or bead portion 14 with a shroud or shield portion 16 extending outwardly.

The shroud portion has a wide or top portion 18 which narrows down on both sides in an S-type curve at the edge 20 to a narrow lip 22 at the bottom. The bead portion 14 as shown in Figure 3 has a back flange 24 and resolves into a camming bead 26 extending inwardly, which bead turns again outwardly into the axially extending flange portion 16.

The purpose of this construction is that the camming portion 26 has sufficient length that it extends radially beyond the mirror surface and mirror frame, and due to the spring action of the unit, which will be later described, there will be a camming action which draws the flange 24 up against the back of the mirror adjacent the periphery thereof, creating a tight seal which prevents water from being driven between the shield and the frame.

If desired, this sealing action may be enhanced by a small annular gasket 30 positioned inside the flange 24, Figure 6.

The fastening element for the shield accessory consists of a spring having hooked ends which co-operate with camming slots in the narrow ends of the mirror as shown in Figures 2, 4 and 5. A spring 36 having a corrugated or saw tooth shape has two hooked ends 38 and 40 lying in a plane normal to the body of the spring. The ends 42 and 44 of the shield are provided with slots 48 and 50, each angled toward the ends and toward the beaded edge.

When the ends 38 and 40 of spring 36 are projected into the slots 48 and 50, the spring 36 is drawn toward the mirror frame and the ends will contact the inside of the mirror or frame to tighten the assembly. With this arrangement, the spring can be used to hold the device as shown in Figure 2 around a mirror which has a circumference less than the total circumference of the shield.

In Figure 4 the ends of the unit are shown in a position in which it would be assembled if the circumference of the mirror was slightly greater than the circumference of the shield. Thus, the shield may be used to surround mirrors of different diameters within quite a wide range.

The camming action of the spring 36 is best shown in Figure 5. The hooked ends are brought into contact with the mirror to prevent snagging.

In Figure 7, a construction has been shown wherein the shield is placed around a mirror 60 prior to the time that the back portion 62 is applied, thus causing the back portion to have a clamping flange 64 which locks the shield in place. With this arrangement, a gasket 66 may be provided to seal the rear of the mirror to prevent moisture from accumulating thereon. When the shield is permanently assembled, the narrow ends may be left imperforate and dimensioned to meet at the bottom of the mirror.

In Figure 8 a modified plastic mirror shield is shown in section having a shroud or shield portion 76 with a radial flange 78 to lock behind a mirror. Forward of the flange 78 are inwardly extending lugs 80 which are molded integrally with the body of the shield and which serve to cam the flange 78 against the back of a mirror casing.

The narrowed ends 82 of the shield portion 76 are provided with openings in the same manner as described in connection with Figures 1 and 2 so that they may be linked together by a corrugated, double-ended hook spring 84. If desired, hooks may be molded or formed on the ends facing away from the gap and to be connected by a looped spring.

In Figure 12 is shown a modified clamping construction for the ends of the encircling shield. The ends are shown at 96 and 98 having short, outwardly turned tabs 99 and 100 which are joined by an elastic ring member 102 consisting of a rubber band or a closed coil spring.

In Figure 10 a sectional view shows the manner in which the flange and the lugs 80 co-operate to hold the flange 78 against the back of the mirror 94.

In Figure 11 a modified construction is shown in which a shield portion 86 having a flanged portion 88 is provided at the edge on the outer surface with a recessed edge groove 90 which follows down the contour of the shield portion 86 to the bottom.

The function of this groove is to provide a surface break so that water driving up the outer surface of the shield 86 due to the effect of air flow passing the shield will have a tendency to form in drops and run down the groove 90 before it reaches the edge 92 of the shield. Thus, it will not tend to run down the inside of the shield toward the mirror.

It will thus be seen that I have shown a mirror shield which may be applied either as an accessory with an adaptable fastening system for various sized mirrors or as a permanent part of a mirror assembly.

What I claim is:

1. A mirror shield comprising an integral one-piece molded unit comprising a shield portion to be positioned axially of the mirror at the edge thereof and a holding portion including an inwardly extending radial flange in a single plane at one edge of said shield portion to engage the rim of a circular mirror, and inwardly extending, spaced lugs on the inner side of said shield portion adjacent said flange portion shaped to taper toward the center of said shield and away from said flange portion whereby the lugs serve to cam the flange toward the back of a mirror frame, said shield portion being formed in an open circular shape having slight resilience to clamp on the edges of the mirror, and means joining the ends of said shield portion to draw them together to increase said camming effect of said lugs.

2. A mirror shield of the type defined in claim 1 wherein each end of said shield portion has a plurality of openings therein with a spring selectively engaging said openings to draw the ends of said shield portion together to increase said camming effect of said lugs, said openings being angled to cam the spring toward said flange.

References Cited in the file of this patent

UNITED STATES PATENTS

| Number | Name | Date |
|---|---|---|
| 685,695 | Seymore | Oct. 29, 1901 |
| 1,221,305 | Gabel | Apr. 3, 1917 |
| 2,442,504 | Miller | June 1, 1948 |

FOREIGN PATENTS

| Number | Country | Date |
|---|---|---|
| 212,098 | Great Britain | Mar. 6, 1924 |
| 418,684 | Great Britain | Oct. 30, 1934 |